US012194481B2

(12) United States Patent
Har-Shai

(10) Patent No.: US 12,194,481 B2
(45) Date of Patent: Jan. 14, 2025

(54) REFILLABLE DISPENSER AND PRESSURIZED REFILLING DEVICE

(71) Applicant: GreenSpense Ltd., Misgav (IL)

(72) Inventor: Gadi Har-Shai, Hod-HaSharon (IL)

(73) Assignee: GreenSpense Ltd., Moshav Ram On (IL)

(*) Notice: Subject to any disclaimer, the term of this patent is extended or adjusted under 35 U.S.C. 154(b) by 653 days.

(21) Appl. No.: 17/286,911

(22) PCT Filed: Oct. 20, 2019

(86) PCT No.: PCT/IL2019/051134
§ 371 (c)(1),
(2) Date: Apr. 20, 2021

(87) PCT Pub. No.: WO2020/079697
PCT Pub. Date: Apr. 23, 2020

(65) Prior Publication Data
US 2021/0354154 A1 Nov. 18, 2021

Related U.S. Application Data

(60) Provisional application No. 62/748,404, filed on Oct. 20, 2018.

(51) Int. Cl.
*B05B 11/00* (2023.01)
*B05B 11/02* (2023.01)

(52) U.S. Cl.
CPC ........ *B05B 11/0056* (2013.01); *B05B 11/026* (2023.01); *B05B 11/028* (2023.01)

(58) Field of Classification Search
CPC .. B05B 11/0056; B05B 11/026; B05B 11/028
USPC .............................................................. 141/2
See application file for complete search history.

(56) References Cited

U.S. PATENT DOCUMENTS 3,288,334 A * 11/1966 Corsette ................ B65D 35/28 222/321.9
9,409,698 B2 8/2016 Har-Shai
9,758,641 B2 9/2017 Schwartz
(Continued)

FOREIGN PATENT DOCUMENTS

DE 102013218741 3/2015
EP 2335833 6/2011
(Continued)

OTHER PUBLICATIONS

International Search Report and the Written Opinion Dated Feb. 6, 2020 From the International Searching Authority Re. Application No. PCT/IL2019/051134. (20 Pages).
(Continued)

*Primary Examiner* — Craig M Schneider
*Assistant Examiner* — Christopher M Afful

(57) ABSTRACT

A kit includes a refillable dispenser that is propellant-free and a filling device that is pressurized and propellant-free. An outlet of the filling device is configured to disengageably connect to an inlet of the refillable dispenser, and wherein connection between the inlet and the outlet establishes fluid communication between the filling device and the refillable dispenser and generates a unidirectional flow of material from the filling device to the refillable dispenser.

29 Claims, 10 Drawing Sheets

(56) References Cited

U.S. PATENT DOCUMENTS

| | | | | |
|---|---|---|---|---|
| 2010/0193547 | A1* | 8/2010 | Laidler | B29C 49/06 222/207 |
| 2012/0205401 | A1* | 8/2012 | Litten | B05B 11/1052 141/2 |
| 2016/0023228 | A1* | 1/2016 | Scott | B05B 11/10 141/2 |
| 2018/0282052 | A1* | 10/2018 | Har-Shai | B65D 83/0061 |

FOREIGN PATENT DOCUMENTS

| | | |
|---|---|---|
| WO | WO 90/14284 | 11/1990 |
| WO | WO 2012/117401 | 9/2012 |
| WO | WO 2013/008241 | 1/2013 |
| WO | WO 2013/014626 | 1/2013 |
| WO | WO 2014/111939 | 7/2014 |
| WO | WO 2014/111940 | 7/2014 |
| WO | WO 2017/064707 | 4/2017 |
| WO | WO 2017/130186 | 8/2017 |
| WO | WO 2018/134816 | 7/2018 |
| WO | WO 2020/079697 | 4/2020 |

OTHER PUBLICATIONS

International Preliminary Report on Patentability Dated 2021 From the International Bureau of WIPO Re. Application No. PCT/IL2019/051134. (15 Pages).

Communication Pursuant to Article 94(3) EPC Dated Jun. 7, 2023 From the European Patent Office Re. Application No. 19795365.6 (8 Pages).

Office Action Dated Feb. 26, 2024 From the Israel Patent Office Re. Application No. 282497. (4 Pages).

* cited by examiner

REFILLABLE DISPENSER AND PRESSURIZED REFILLING DEVICE

RELATED APPLICATIONS

This application is a National Phase of PCT Patent Application No.

PCT/IL2019/051134 having International filing date of Oct. 20, 2019, which claims the benefit of priority under 35 USC § 119 (e) of U.S. Provisional Patent Application No. 62/748,404 filed on Oct. 20, 2018. The contents of the above applications are all incorporated by reference as if fully set forth herein in their entirety.

FIELD AND BACKGROUND OF THE INVENTION

The present invention, in some embodiments thereof, relates to dispensers that are filled under pressure, and, more particularly, but not exclusively, to a refillable dispenser and pressurized filling device suitable for home and personal use.

Many consumers use and even carry a dispenser of some type with them on a regular basis. The material contained in the dispenser may be a liquid, a foam, gel, paste or other viscous material. Common examples of such materials include hand and face cream, perfume, gels or other form of make-up, cleansers, moisturizers, serums, material with herbal or medicinal properties. It is typically desirable for the dispenser to be compact in size and weight. A compact dispenser is comfortable to handle, store as well as carry. Optionally a compact dispenser may be sized to meet regulations for carrying in a carry-on bag when traveling by plane.

One drawback of a compact sized dispenser is that it is limited in the amount of material it can contain. Frequent discarding of emptied dispensers and purchasing of a new dispenser filled with the desired material is wasteful and expensive. Some dispensers, e.g., liquid soap or shampoos may be refilled based on unscrewing a cap of the dispenser and pouring in material. However, other dispenser s and/or materials dispensed may not be suitable for refilling in this manner. For example, refilling by pouring may be cumbersome due to viscosity of the material to be dispensed, the material's sensitivity to contamination when exposed to surrounding air, the size of a neck of the compact dispenser and/or the risk of the material spilling, e.g. for materials that are costly or toxic.

Dispenser filling machines for pressurized filling are available commercially and are known to be used for example to fill aerosol cans as well as propellant-free dispenser bottles. Such dispenser filling machines may fill the dispenser bottle in sterile conditions or without exposing the product to surrounding air. Pressure is often required to fill a dispenser with viscous materials from a filling machine. Known dispenser filling machines are typically large and cumbersome and are intended for industrial use and in industrial surroundings.

International patent publication No. WO/2012/117401, entitled "Propellant-free pressurized material dispenser," discloses devices and methods for dispensing a fluidly dispensable material under pressure but without using a gas propellant. It is described that an elastic sleeve is utilized to impart pressure to a bag of dispensable material positioned within the sleeve. Pressure so created pressurizes contents of the bag, which can then be dispensed through a valve. Methods for manufacturing various embodiments are presented.

SUMMARY OF THE INVENTION

According to an aspect of some embodiments there is provided kit which comprises a refillable dispenser, and a pressurized refilling device, typically configured for home, and personal use. According to some example embodiments, the refillable dispenser with the pressurized refilling device may provide safer, more efficient and longer-term use of a compact material dispenser that is suitable for personal, home and on-the-go, everyday use. The refillable dispenser with the pressurized refilling device provides an environmental friendly approach with less packaging waste.

According to some example embodiments, the refillable dispenser removably mounts on the pressurized refilling device and automatically fills with material stored in the pressurized refilling device when mounted. Preferably, the pressurized refilling device is configured to store the material under pressure and to fill the dispenser mechanically without the need of electrical power. The pressurized refilling device may optionally and preferably be a propellant-free refilling device in which the material contained therein is stored under pressure. In some example embodiments, the refillable dispenser contains the material under a non-pressurized state (e.g. at atmospheric pressure) and dispenses the material in a dosage manner using an airless pump or the like. Alternatively, the refillable dispenser may be pressurized and may be configured for continuous dispensing. Pressure in a pressurized refillable dispenser may be below the pressure in the pressurized refilling device to facilitate the refilling.

According to an aspect of some example embodiments, there is provided a kit comprising: a refillable dispenser that is propellant-free, and a filling device that is pressurized and propellant-free, wherein an outlet of the filling device is configured to disengageably connect to an inlet of the refillable dispenser, and wherein connection between the inlet and the outlet establishes fluid communication between the filling device and the refillable dispenser and generates a unidirectional flow of material from the filling device to the refillable dispenser.

Optionally, the refillable dispenser comprises a valve fitted at the inlet, the valve being configured to be in a normally closed state and to open based on actuating a pressing force on the valve.

Optionally, the filling device comprises a filling valve at the outlet, the filling valve being configured to control release of the material from filling device.

Optionally, the filling device comprises an adaptor configured to provide the fluid communication based on the connection.

Optionally, the refillable dispenser includes a second outlet fitted with an airless through which the material is dispensed.

Optionally, the refillable dispenser comprises a conduit extending from the inlet to the second outlet, wherein the conduit includes at least one opening along its length, and wherein the at least one opening is in fluid communication with an inner volume of the refillable dispenser through which the material may flow.

Optionally, the filling device comprises an inlet fitted with a second valve through which the material is to be received for refilling the reservoir, wherein the second valve is configured to be in a normally closed state and to open based on actuating a pressing force on the second valve.

According to an aspect of some example embodiments, there is provided a refillable dispenser comprising: a reservoir configured to contain a material to be dispensed; an outlet through which the material within the reservoir is to be dispensed; an inlet through which the material is to be received for refilling the reservoir with the material; and a valve fitted in the inlet, wherein the valve is configured to be in a normally closed state and to open based on actuating a pressing force on the valve and wherein flow of the material into the reservoir is based on pressurized flow through the valve and wherein the valve is configured to disengageably connect to an adaptor of a matching filling device.

Optionally, the refillable dispenser includes a pump, wherein the pump is fitted in the outlet and is configured for dispensing material from the refillable dispenser.

Optionally, the pump is an airless pump configured to dose the dispensing.

Optionally, the refillable dispenser includes a press valve fitted in the outlet and wherein the press valve is configured for continuous flow.

Optionally, the reservoir includes a base and a top end opposite the base and wherein the inlet is formed in the base.

Optionally, the refillable dispenser is a propellant-free dispenser.

Optionally, the reservoir includes a flexible bag with an open end, wherein the open end is fitted around the valve with a sealed fitting and wherein the valve is configured to control flow of the material into the bag.

Optionally, the refillable dispenser includes an elastic sleeve surrounding the bag, wherein the elastic sleeve is configured to apply elastic pressure on the flexible bag.

Optionally, the refillable dispenser includes a piston within the reservoir, wherein the piston is configured to move along a longitudinal direction along the reservoir based on the material being dispensed or filled.

Optionally, the refillable dispenser includes a conduit extending from the inlet to the outlet, wherein the conduit includes at least one opening along its length, wherein the at least one opening is in fluid communication with the reservoir.

Optionally, the conduit is configured to be rigid.

Optionally, the material is a liquid, a foam, gel, serum, or paste.

According to an aspect of some example embodiments, there is provided a pressurized refilling device comprising: a reservoir configured to contain a material; a filling valve configured to control release of the material contained in the reservoir; a docking base configured to receive a refillable dispenser to be filled, wherein the refillable dispenser to be filled includes a first valve through which the material is received within the refillable dispenser; and an adaptor configured to provide fluid communication between the filling valve and the first valve based on the refillable dispenser being mounted on the docking base.

Optionally, the filling valve is configured to be in a normally closed state and to open based on actuating a pressing force on the filling valve with the adaptor.

Optionally, the adaptor is configured to apply a pressing force on at least one of the filling valve and the first valve based on the refillable dispenser being mounted on the docking base.

Optionally, the docking base includes screw threads and wherein the refillable dispenser is configured to be mounted on the docking base on a screwing the refillable dispenser to the docking base.

Optionally, the docking base includes a female or male portion of a snap and wherein the refillable dispenser is configured to be mounted on the docking base on snapping the refillable dispenser to the docking base.

Optionally, the filling valve is a press valve and wherein the press valve is configured for continuous dispensing.

Optionally, the device is a propellant-free dispenser.

Optionally, the reservoir includes a flexible bag for containing the material, wherein an open end of the flexible bag is fitted around the filled valve with a sealed fitting and wherein the filling valve is configured to control flow of the material out of the flexible bag.

Optionally, the device includes an elastic sleeve surrounding the bag, wherein the elastic sleeve is configured to apply elastic pressure on the flexible bag.

Optionally, the device includes an inlet through which the material is to be received for refilling the reservoir.

Optionally, the device includes a second valve that is fitted in the inlet, wherein the second valve is configured to be in a normally closed state and to open based on actuating a pressing force on the second valve.

Optionally, the adaptor is movable with respect to the docking base and is configured to advance toward the filling valve based on mounting the refillable dispenser on the docking base.

Optionally, the reservoir is configured to contain the material under pressure.

Optionally, the pressure is 2 bars to 5 bars.

Optionally, the material is a liquid, a foam, gel or paste.

According to an aspect of some example embodiments, there is provided a kit, comprising: a refillable dispenser comprising: a first reservoir configured to contain a material to be dispensed; an first outlet through which the material within the reservoir is to be dispensed; an inlet through which the material is to be received for refilling the first reservoir with the material; and a first valve fitted in the inlet, wherein the first valve is configured to be in a normally closed state and to open based on actuating a pressing force on the first valve and wherein flow of the material into the first reservoir is based on pressurized flow through the first valve; and a pressurized refilling device comprising: a second reservoir configured to contain a material; a filling valve configured to control release of the material in the second reservoir; a docking base configured to receive the refillable dispenser; and an adaptor configured to provide fluid communication between the first valve and the filling valve based on the refillable dispenser being mounted on the docking base.

Optionally, the refillable dispenser is according to the refillable dispenser described herein above.

Optionally, the pressurized refilling device is according the pressurized refilling device described herein above.

Optionally, pressure in the second reservoir is greater than the pressure in the first reservoir.

Optionally, volume of the second reservoir is at least 5 times greater than that of the first reservoir.

According to an aspect of some example embodiments, there is provided a method of filling a refillable dispenser, the method comprising connecting an inlet of refillable dispenser that is propellant-free to an outlet of a filling device that is propellant-free and pressurized, so as to establish fluid communication between the filling device and the refillable dispenser and to generate a unidirectional flow of material from the filling device to the refillable dispenser.

Optionally, each of the inlet and the outlet is fitted with a normally closed valve and wherein connecting the inlet to the outlet includes simultaneously opening each of the normally closed valves.

Optionally, the normally closed valves are aerosol valves and wherein simultaneously opening each of the normally closed valves includes pressing stems of the normally closed valves against each other.

According to an aspect of some example embodiments, there is provided a method of dispensing a material, comprising executing the method as described herein above, and dispensing the material out of the refillable dispenser while the refillable dispenser is connected to the filling device.

According to an aspect of some example embodiments, there is provided a method of refilling a refillable dispenser, the method comprising: positioning a refillable dispenser on a docking base of a pressurized filling device wherein the refillable dispenser comprises: an inlet through which material is to be received for refilling the dispenser; and a valve fitted in the inlet, wherein the valve is configured to be in a normally closed state and to open based on actuating a pressing force on the valve and wherein flow of the material into the refillable device is based on pressurized flow through the valve; advancing the valve of the refillable dispenser toward a filling valve of the pressurized filling device with a locking motion; filling the refillable dispenser with material contained in the pressurized filling device; and releasing the refillable dispenser from the docking base.

Optionally, the refillable dispenser is a propellant-free device.

Optionally, the pressurized filling device is a propellant-free device and wherein material contained in the pressurized filling device is contained at a pressure of 2-10 bars.

Optionally, the material is a liquid, a foam, gel, or paste.

Optionally, the filling is actuated without exposing the material to air.

Optionally, the refillable dispenser is as described herein above.

Optionally, the pressurized filling device is as described herein above.

Unless otherwise defined, all technical and/or scientific terms used herein have the same meaning as commonly understood by one of ordinary skill in the art to which the invention pertains. Although methods and materials similar or equivalent to those described herein can be used in the practice or testing of embodiments of the invention, exemplary methods and/or materials are described below. In case of conflict, the patent specification, including definitions, will control. In addition, the materials, methods, and examples are illustrative only and are not intended to be necessarily limiting.

BRIEF DESCRIPTION OF THE SEVERAL VIEWS OF THE DRAWING(S)

Some embodiments of the invention are herein described, by way of example only, with reference to the accompanying drawings (including images). With specific reference now to the drawings in detail, it is stressed that the particulars shown are by way of example and for purposes of illustrative discussion of embodiments of the invention. In this regard, the description taken with the drawings makes apparent to those skilled in the art how embodiments of the invention may be practiced.

DESCRIPTION OF SPECIFIC EMBODIMENTS OF THE INVENTION

Figure 1:
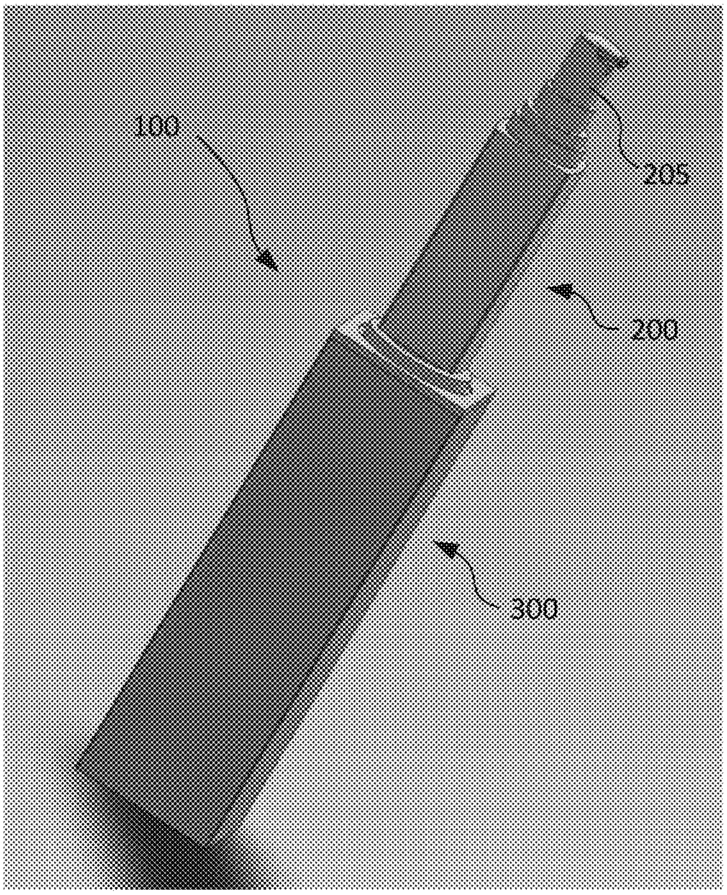
FIG. 1 is a simplified schematic drawing of an example dispenser refilling kit including a refillable dispenser and a pressurized refilling device in accordance with some example embodiments.

The present invention, in some embodiments thereof, relates to a dispenser that is filled under pressure, and, more particularly, but not exclusively, to a refillable dispenser and a pressurized filling device suitable for home and personal use.

According to an aspect of some example embodiments, there is provided a refillable dispenser that is propellant-free and suitable for dispensing materials such as liquids, foams gels, pastes, and other viscous materials. The material may be for a product from one of the 5 common industry categories personal care (e.g., deodorants, hair spray, shaving gel, body lotions, creams and serums), home care (e.g., cleaning products, insect repellants, air fresheners), technical applications (e.g., lubricants, paint, lacquers), pharmaceutical (e.g., inhalers, skin and muscles treatment) and/or a food product (e.g., cooking oil, salad dressing, and whipped cream). The material may include for example a cosmetic product, a paint, a lacquer, a glue, a lubricant, a sealant, a paste, a personal care gel, a soap, a shampoo, an antiperspirant, a sun care product, a toothpaste, a cleaner, a polish, an insecticide, a medication, a material effective in extinguishing fires. In some embodiments of the present invention the material dispensed is selected from the group consisting of a food product, a cosmetic product, a pharmaceutical product, and a household product. The refillable dispenser may contain the material it dispenses in a non-pressurized state (e.g., at atmospheric pressure), and may include a regular pump or an airless pump to dispense the material in a dosage manner. Alternatively, the refillable dispenser can include a squeeze valve or outlet. The housing of the refillable dispenser may be flexible. This embodiment is particularly advantageous when the refillable dispenser includes a squeeze valve, in which case dispensing may optionally and preferably be actuated by squeezing the refillable dispenser instead of by pumping. In other example embodiments, the refillable dispenser stores material under pressure and includes a press valve, e.g., an aerosol valve that provides continuous dispensing, e.g. a valve commonly used in aerosol cans.

According to some example embodiments, the refillable dispenser additionally includes valve at an inlet of refillable dispenser that is dedicated for refilling the refillable dispenser with a pressurized refilling device. The valve for refilling may be positioned at a base of the refillable dispenser and opposite the airless pump or other outlet means for dispensing the material in refillable dispenser during use. In some example embodiments, the valve at the inlet is a press valve as is known to be used in aerosol cans. According to some example embodiments, the press valves as defined herein is a valve that is in a normally closed state and opens based on pressing a stem of the valve against a spring force.

According to some example embodiments, the refillable dispenser includes a Bag-On-Valve (BOV) system. Optionally, both the dedicated press valve for filling the refillable dispenser as well as the airless pump or other outlet means for dispensing the material may be welded or otherwise connected with a sealed connection to the bag. In some example embodiments, the refillable dispenser includes a bag as described for example in International patent publication Nos. WO/2012/117401, WO2014/111939, WO2014/111940, WO2013/008241, WO2017/064707, WO2017/130186, and WO2018/134816 incorporated herein above by reference.

According to other example embodiments, the refillable dispenser includes a piston system. In these embodiments, a piston enclosed within the refillable dispenser is configured to advance longitudinally within the refillable dispenser and/or along its height based on a level of material contained within the refillable dispenser. The dispenser may include a barrel, e.g., having a shape of a cylinder, and the piston may move along the length of the barrel. Optionally, both the dedicated press valve for filling the refillable dispenser as well as the airless pump or other outlet means for dispensing the material may be connected with a sealed connection to the barrel. The piston provides a barrier between the material in the dispenser and air entering the dispenser as the material is dispensed. Optionally, contamination and oxidation of the material is prevented or reduced in this manner. The position of the piston moves in one direction while filling the refillable dispenser and in an opposite direction while dispensing from the refillable dispenser.

Optionally, the refillable dispenser includes a conduit fluidly connected to both the press valve for refilling the refillable dispenser and the airless pump or alternate means for dispensing. The conduit includes at least one opening along it length to provide fluid communication between the conduit and an inner volume of the refillable dispenser containing the material to be dispensed. The conduit may be integrated in either one of the BOV systems or piston systems. For embodiments including the piston system, the piston preferably includes a through-hole through which the conduit is deployed. The interface between the piston and the conduit at the through-hole in the piston is preferably sealed to prevent or reduce the likelihood of material leakage through the through-hole. For embodiments including the piston system and the conduit, the opening(s) in the conduit is preferably beyond the endpoint of the stroke of the piston along the barrel, so that flow of material through the opening(s) in the conduit is allowed into a volume between the piston and the outlet of the dispenser, and not into a volume between the piston and the inlet of the dispenser.

According to an aspect of some example embodiments, there is provided a pressurized filling device configured to refill the refillable dispenser. According to some example embodiments, the pressurized filling device is a propellant-free dispenser configured to dispense material under pressure. The pressurized filling device may be configured to be safe for home use. According to some example embodiments, the pressurized filling device includes a reservoir containing the material to be refilled, a press valve, e.g., an aerosol press valve, configured to release the material when pressed, a docking base configured to receive the refillable dispenser, and an adaptor configured to fluidly connect the press valve of the refillable dispenser and press valve of the pressurized refilling device while the refillable dispenser is mounted on the docking base. In other example embodiments, the adaptor is integrated with one or more of the valves. For example, the press valves may be a female-female valve or a male-female valve. In some example embodiments, the pressurized refilling device includes a flexible bag containing the material and an elastic sleeve that imparts the desired pressure to the bag. Optionally and preferably, the flexible bag, although flexible, is not elastic. Pressure so created pressurized the contents of the bag which may be dispensed through the press valve.

According to some example embodiments, fluid connection between the refillable dispensing and the pressurized filling device may be initiated by connecting the refillable dispenser to the docking base of the pressurized refilling device while pressing the press valve of the refillable dispenser against the press valve of the pressurized refilling device based on the mounting action. The mounting may be by a screwing housing of the refillable dispenser into the docking base, and/or by snapping the refillable dispenser into a mating snap of the docking base. Or other methods of attaching and releasing two parts.

In some example embodiments, the refillable dispenser is sized to be compact and is configured to contain a volume that is significantly smaller than a volume of material that the reservoir is configured to contain. Optionally, the reservoir is sized to contain 5-50 times the maximal volume of material that the refillable dispenser can contain. For example, the reservoir may be configured to hold 50 ml of material and while the refillable dispenser may be configured to hold 5 ml of material. Other example volumes may include 100, 200, 300 or 1,000 ml for the reservoir and 10, 20, 50 or 100 ml for the refillable dispenser.

In some example embodiments, the pressurized filling device is additionally configured to be refilled at the store, hospital, filling station, factory or supplier, instead of being discarded once emptied. Optionally, the pressurized filling device may be filled using a higher pressure reservoir as compared to the pressure of the pressurized filling device. In some example embodiments, the pressurized filling device includes a dedicated press valve configured for filling its reservoir. In some example embodiments, the pressurized refilling device is pressurized to 2-6 bars, e.g. 3-4 bars. Optionally, the refillable dispenser is pressurized to 1-2 bars.

According to some example embodiments, mounting of the refillable dispenser on the pressurized refilling device actuates simultaneous pressing of both press valves (the press valve of the refillable dispenser and the press valve of the pressurized refilling device). During this actuated open state, material from the pressurized refilling device flows into the refillable dispenser due to the higher pressurized state of the pressurized refilling device as compared to the pressure within the refillable dispenser. Dismounting the refillable dispenser, optionally and preferably simultaneously releases both press valves (the press valve at the inlet of the refillable dispenser and the press valve of the pressurized refilling device) to their normally closed state. Once filled, the refillable dispenser may contain the material in atmospheric pressure, or alternatively in a defined pressure below the higher pressurized state of the pressurized refilling device. Material from the refillable dispensing device may be dispensed while mounted on the pressurized filling device, as well as when disengaged with the pressurized filling device.

Reference is now made to FIG. 1 showing a simplified schematic drawing of an example dispenser refilling kit including a refillable dispenser and a pressurized refilling device in accordance with some example embodiments. According to some example embodiments, a dispenser refilling kit 100 includes a refillable dispenser 200 and a pressurized filling device 300. Refillable dispenser 200 optionally and preferably includes an airless pump 205 for dispensing material contained therein. Optionally, dispensing is in a continuous manner. In some example embodiments, refillable dispenser 200 may alternatively include a squeeze valve or an aerosol type valve for dispensing material contained therein. Refillable dispenser 200 is preferably sized to be portable and to contain material to be dispensed in a non-pressurized state or in at a relatively low pressurized state, e.g. 1-3 bars. Optionally, refillable dispensing device 200 is a propellant-free dispenser. Dispensing through refillable dispenser 200 may optionally and preferable be performed while refillable dispenser 200 is dismounted from pressurized filling device 300 and optionally may also be performed while mounted on pressurized filling device 300.

According to some example embodiments, refillable dispenser 200 is automatically refilled based on being mounted on pressurized filling device 300. Mounting of refillable dispenser 200 on pressured filling device 300 may be by screwing, snapping or otherwise pressing refillable dispenser 200 onto pressured filling device 300. The refilling is optionally and preferably performed mechanical with no need for electrical power. Optionally, the refilling occurs within less than 1 second or less than 3 seconds, e.g. 0.1-10 seconds. According to some example embodiments, material contained in pressured filling device 300 is held at a higher pressure as compared to the material contained in refillable dispenser 200. In some example embodiments, the pressurized refilling device is pressurized to 2-6 bars, e.g. 3-4 bars.

Pressurized filling device 300 houses a volume that is optionally and preferably 5-50 times a volume housed by refillable dispenser 200. For example, pressurized filling 300 device may house a volume of about 50-150 ml and refillable dispenser 200 may house a volume of 5-15 ml. Optionally, refillable dispenser 200 may be compact in size and may for example have a height that is 8-10 cm. Pressurized filling device 300 may have a height of 12-15 cm or more.

Material contained in pressurized filling device 300 and supplied to refillable dispenser 200 may be a liquid, a foam, gel, serum, or paste or other viscous material.

Figure 2:
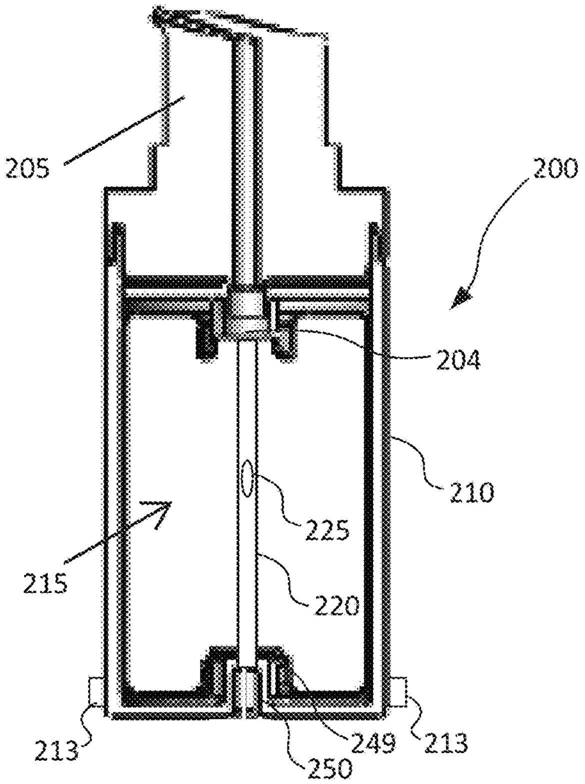
FIG. 2 is a simplified schematic drawing of an example refillable dispenser of the kit in accordance to some example embodiments of the invention.

Reference is now made to FIG. 2 showing a simplified schematic drawing of an example refillable dispenser in accordance to some example embodiments of the invention. According to some example embodiments, a refillable dispenser 200 includes a reservoir 215 confined within a housing 210, an outlet 204, an airless pump 205 mounted in fluid communication with outlet 204, inlet 249 penetrating into reservoir 210 and a valve 250 fitted into inlet 249. Airless pump 205 dispenses material contained in reservoir 210 in a dosage manner. Optionally, airless pump 205 may be replaced with aerosol type valve or a squeeze valve.

Inlet 249 is configured for receiving flow for refilling refillable dispenser 200. Optionally, inlet 249 is positioned at a base of housing 210 and optionally opposite airless pump 205. In other example embodiments, valve 250 may be positioned along the side of the package or in conjunction with the airless pump 205. According to some example embodiments, valve 250 is configured to be in a normally closed state and to open based on actuating a pressing force on valve 250. Valve 250 may optionally and preferably be an aerosol type valve. Optionally valve 250 is configured for continuous flow while pressed. In some example embodiments, refillable dispenser 200 includes a conduit 220 that extends from inlet 249 to outlet 204 and includes an opening 225. Flow into reservoir 215 may be received through valve 250, may be directed through conduit 220 and expelled into reservoir 215 through opening 225. During dispensing with airless pump 205 material contained in reservoir 215 may be suctioned into opening 225 and may flow through conduit 220 toward airless pump 205 for dispensing material. Optionally, conduit 220 includes more than one opening 225 and/or conduit 220 may be perforated along its length. In other example embodiments, conduit 220 is not included or may only extend from one of inlet 249 or from outlet 204. In some example embodiments, housing 210 includes a connecting feature 213 such as for example screw threads, or a snap that is configured to mechanically connect to a docking base of a pressurized filling device. Optionally and preferably, valves fitted in inlet 249 and outlet 204 are unidirectional valves.

In some example embodiments, refillable dispenser 200 includes only one port that serves as both an inlet and an outlet. Optionally, when only one port is included, the single port is fitted with a valve 250 that is bidirectional. During refilling the head of airless pump 250 may be removed (e.g., screwed out) and outlet 204 serves as an inlet and is connected to refilling device 300.

Figure 3:
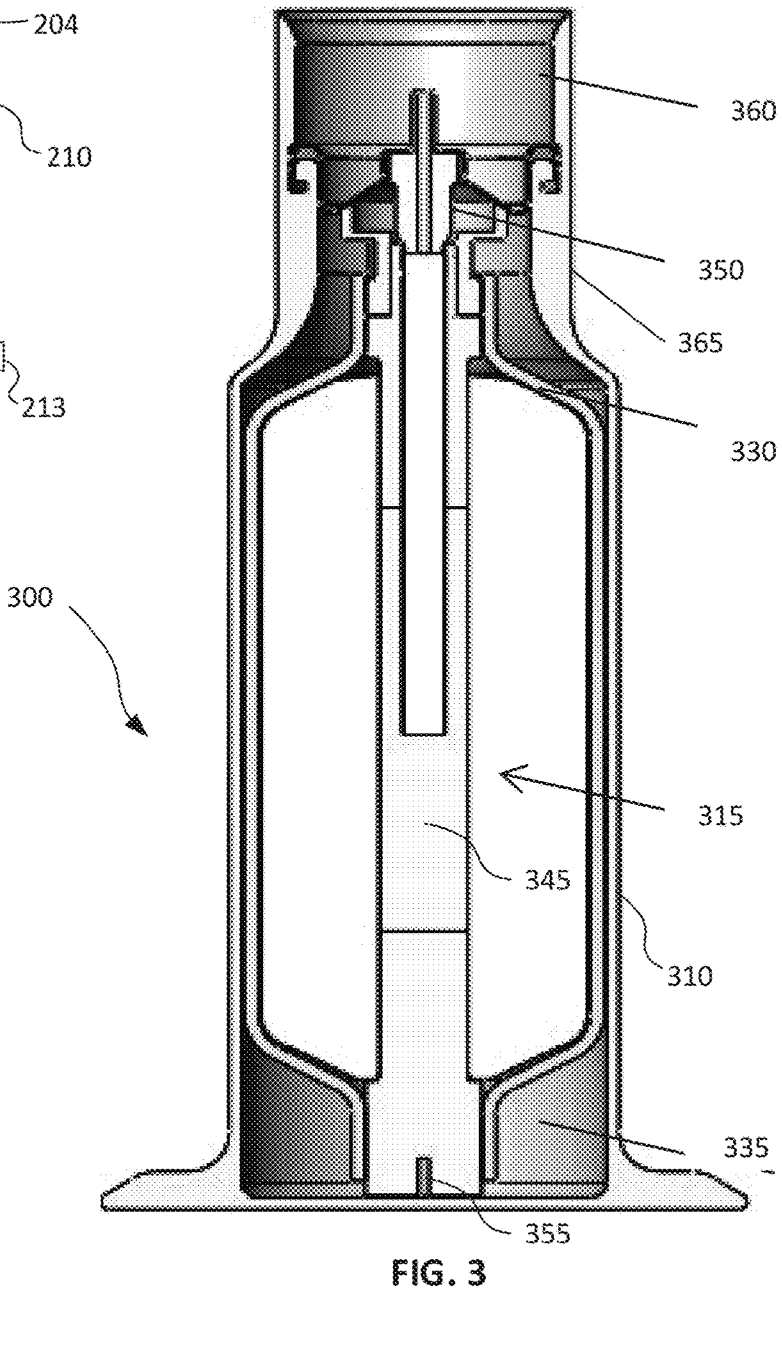
FIG. 3 is a simplified schematic drawing of an example pressurized refilling device of the kit in accordance to some example embodiments of the invention.

Reference is now made to FIG. 3 showing a simplified schematic drawing of an example pressurized refilling device in accordance to some example embodiments of the invention. According to some example embodiments pressurized filling device 300 includes a reservoir 315 enclosed within a housing 310, a filling valve 350 connected to a conduit 345 through which material in reservoir 315 may be expelled for filling a refillable dispenser and a docking base 360 configured for receiving a refillable dispenser. In some example embodiments, pressurized filling device 300 is bottle shaped and docking base 360 and valve 350 are positioned in a bottle neck 365 of pressurized filling device 300. Optionally, conduit 345 is not required.

According to some example embodiments, pressurized filling device 300 is a propellant-free device that is pressurized with an elastic sleeve 335 that encompasses and elastically presses a flexible bag 330, both included within reservoir 315. In some example embodiments, conduit 340 is rigid and is defined to have a diameter that is larger than a diameter of elastic sleeve 335 in a neutral state. In this manner, elastic sleeve 335 may maintain pressure force on flexible bag 330 even when flexible bag 330 is almost empty allowing full evacuation of material. Optionally, material contained in reservoir 315 is contained in flexible bag 330. Optionally and preferably, flexible bag 330 includes in opening that is sealed around valve 350 so that material contained in flexible bag 330 may be dispensed through valve 350. In some example embodiments, pressurized filling device 300 may also be refilled. Optionally, pressurized filling device 300 may be refilled in a refilling station through valve 350. Alternatively, pressurized filling device 300 additionally includes an inlet 355 through which pressurized filling device 300 may be refilled. Optionally inlet 355 may be fitted with a valve, e.g. an aerosol type valve. When pressurized filling device 300 includes inlet 355, flexible bag 330 includes an additional opening sealed around inlet 355 so that flexible bag 330 may be refilled through inlet 355. Optionally and preferably both the valve fitted in inlet 355 and valve 350 are unidirectional valves. In other examples, pressurized filling device 300 may include only one port with valve 350 which is used as an inlet at the shop, factory, hospital for refilling and as an outlet at home for dispensing, e.g., for filling the refillable dispenser 200. In these examples, valve 350 is bidirectional.

According to some example embodiments, the pressure applied on the material for example with elastic sleeve 335 actuates flow from pressurized filling device 300 to refillable dispensing device 200 when refillable dispensing device 200 is mounted on docking base 360. In some example embodiments, docking base 360 includes a connecting feature, e.g. screw threads or snap configured to connect with connecting feature 213 on refillable dispenser or any other connecting/releasing mechanism, between two parts.

Figure 4A:
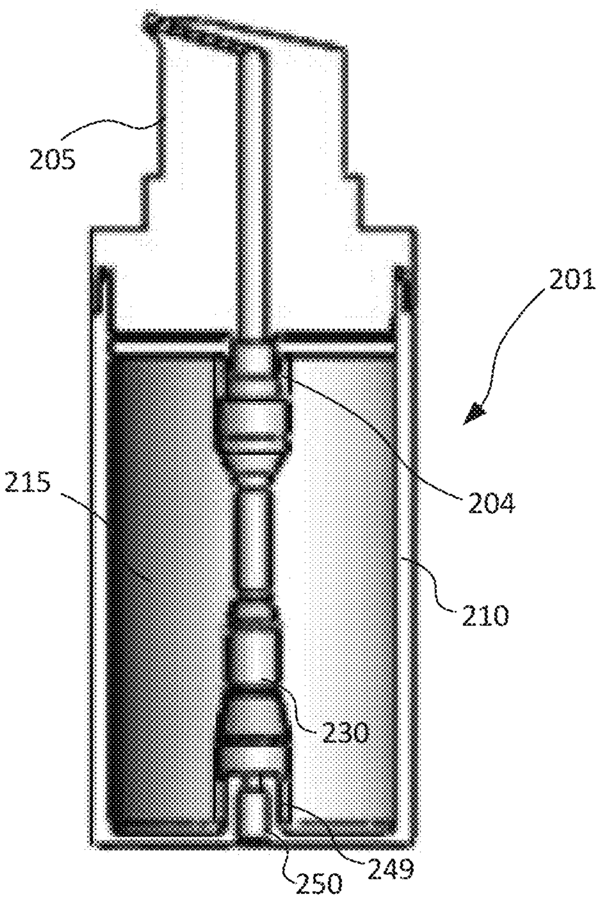
FIGS. 4A and 4B are simplified schematic drawing of an example refillable dispenser of the kit in an empty and filled state, respectively, in accordance to some example embodiments of the invention.
Figure 4B:
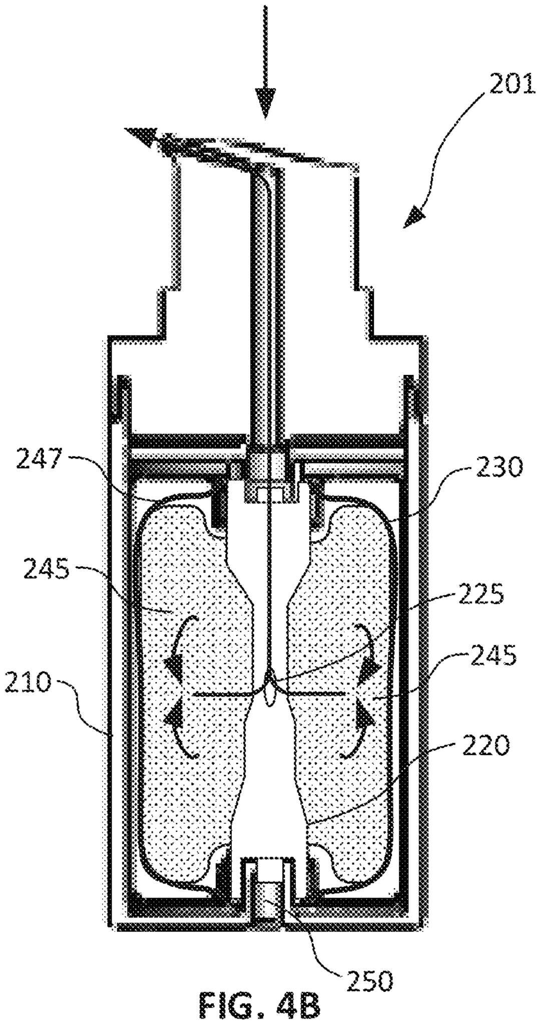

Reference is now made to FIGS. 4A and 4B showing simplified schematic drawing of an example refillable bag type (BOV) dispenser in an empty and filled state respectively in accordance to some example embodiments of the invention. According to some example embodiments, a refillable dispenser 201 includes a flexible bag 230 configured for containing the material to be dispensed. Bag 230 is preferably as described WO2017/064707, the contents of which are hereby incorporated by reference. In some example embodiments, bag 230 includes a first opening that is sealed to inlet 249 and a second opening that is sealed to outlet 204. Each of the sealed connections provides for flow communication under pressure without leakage. Optionally, flexible bag 230 may be folded around conduit 220 when emptied (FIG. 4A) and flexible bag 230 may be unfolded and opened based on material 245 flowing into flexible bag 230 through valve 250. In some example embodiments, conduit 220 is shaped to structurally support flexible bag 230 when folded thereon. Optionally, conduit 220 is configured to be rigid. During dispensing (FIG. 4B) material 245 may be suctioned through opening 225 and out through airless pump 205 which means that air does not enter bag 230. Rather bag 230 collapses based on dispensing of the material and opens based on filling of the material. Alternatively, refillable dispenser may include a bag, without conduit 220, e.g. a regular BOV bag. In some example embodiments, refillable dispenser 201 includes an elastic sleeve 247 surrounding bag 230 and a desired pressure may be imparted on bag 230 with elastic sleeve 247. In some example embodiments, sleeve 247 provides continuous dispensing.

Figure 5A:
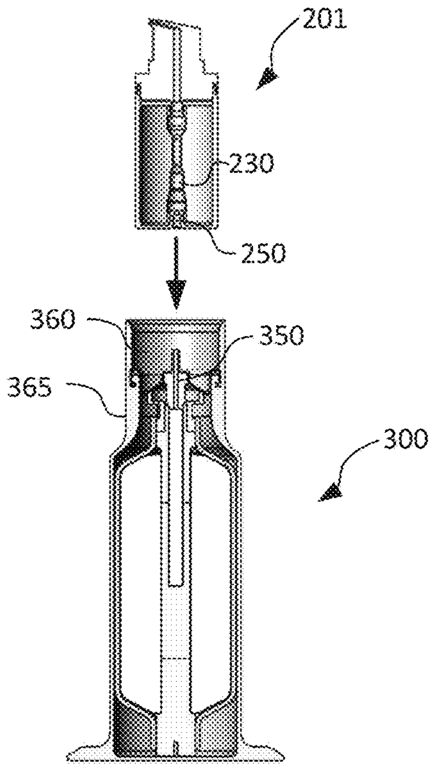
FIGS. 5A, 5B, 5C and 5D are simplified schematic drawings of an example refillable dispenser being filled with an example pressurized refilling device over four consecutive example steps all in accordance with some example embodiments.
Figure 5B:
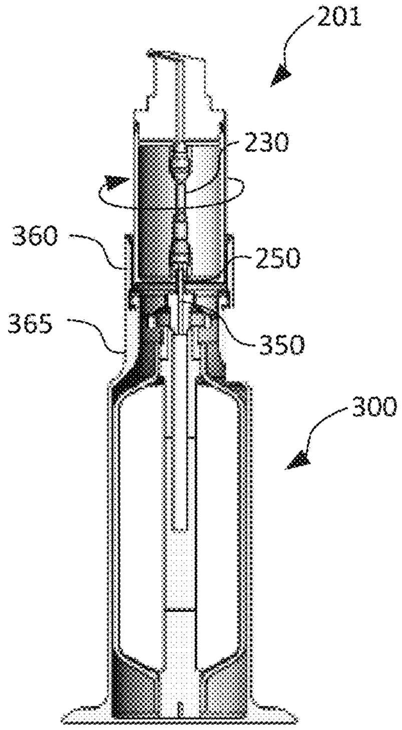
Figure 5C:
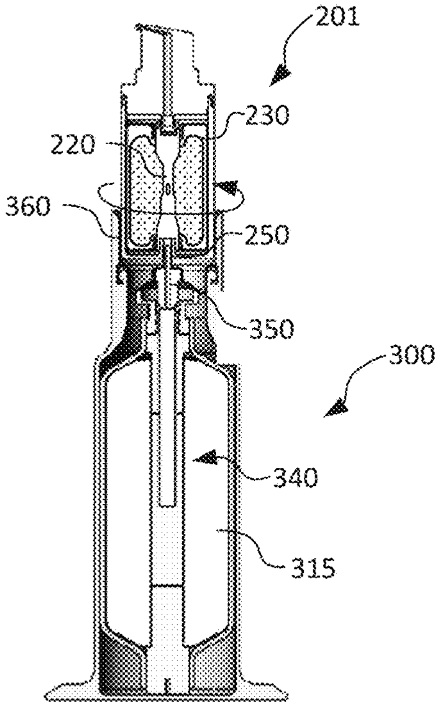
Figure 5D:
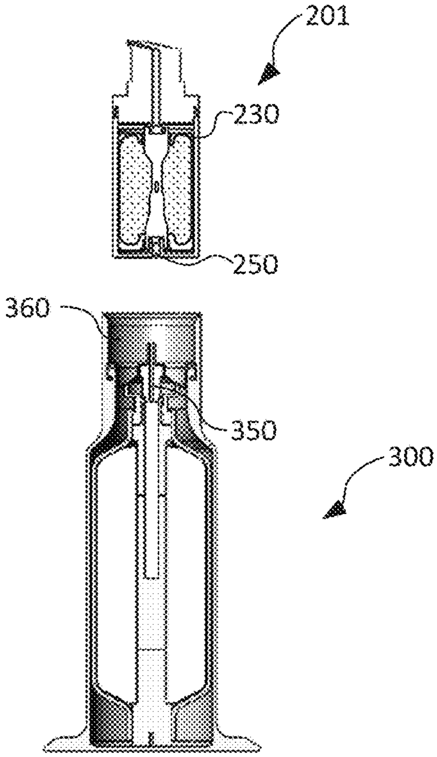

Reference is now made to FIGS. 5A, 5B, 5C and 5D showing simplified schematic drawings of an example refillable bag type dispenser being filled with an example pressurized refilling device over four consecutive example steps all in accordance with some example embodiments. FIG. 5A shows refillable dispenser with bag 230 being positioned on pressurized filling device 300. Optionally bag 230 is in a folded state when empty (as shown in FIG. 5A). Optionally, filling may also be performed when the refillable dispenser is only partially emptied. Optionally, operable engagement (mounting) of refillable dispenser 201 on pressurized filling device 300 may be based on screwing a base of refillable dispenser 201 including valve 250 onto docking base 360 (FIG. 5B). Optionally, filling is initiated automatically based on the mounting and bag 230 may be filled (FIG. 5C). Once filled refillable dispenser 201 may be released from pressurized refilling device 300, e.g. based on unscrewing (FIG. 5C) and the filled refillable dispenser may be detached (FIG. 5D).

Figure 6:
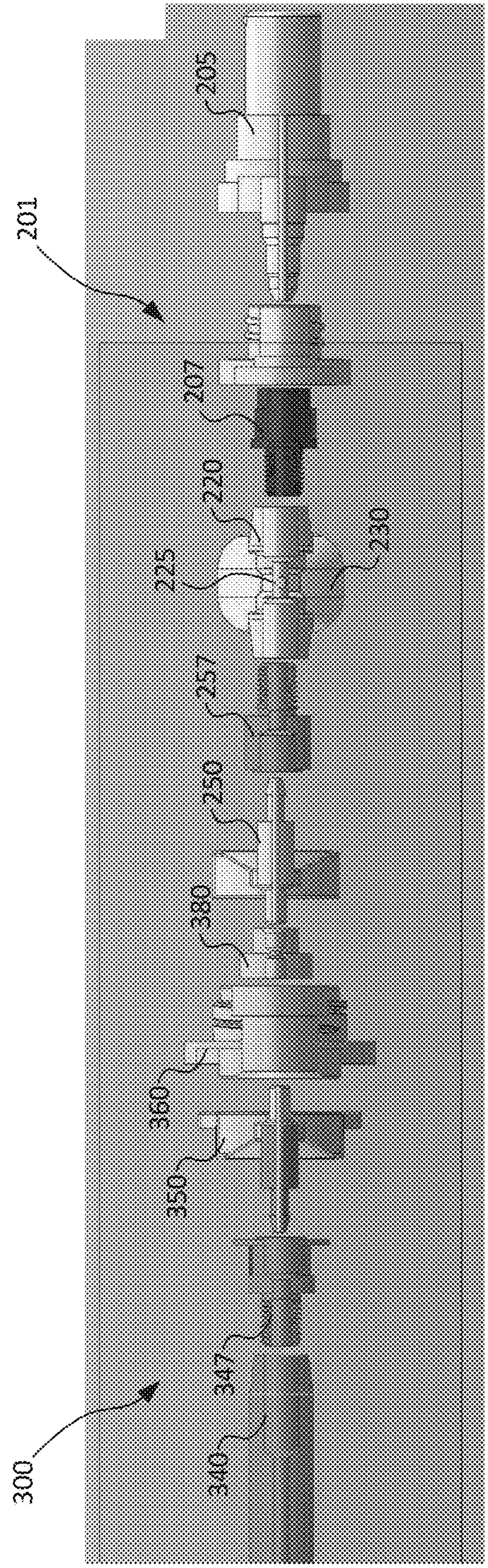
FIG. 6 is an exploded view of example components fluidly connected in dispenser refilling system in accordance with some example embodiments.

Reference is now made to FIG. 6 showing an exploded view of example components fluidly connected in dispenser refilling kit in accordance with some example embodiments. According to some example embodiments, a docking base 360 includes an adaptor 380 that is configured to establish flow communication between valve 350 in pressurized filling device 300 and valve 250 in refillable dispenser 201 when mounted on docking base 360. In some example embodiments, mounting of refillable dispenser 201 on docking base 360 presses both valve 250 within adaptor 380 toward valve 350 in pressurized filling device 300 so that pressure is simultaneously exerted on both valve 350 and valve 250 based on the mounting action. Adaptor 380 may provide a sealed connection between valve 250 and valve 350 so that no leakage occurs during filling. According to some example embodiments, this simultaneous pressure is configured to open valve 350 and valve 250 so that both valves are shifted from a normally closed state to an open state. Due to a pressure difference between pressurized filling device 300 and refillable dispenser 201, flow is directed from pressurized filling device 300 and refillable dispenser 201.

Pressurized filling device 300 may include a connector 347 configured to connect filling valve 350 to inner column or conduit 340. On the refillable dispenser side, a connector 257 may connect valve 250 to one end of conduit 220 and a second connector 207 may connect airless pump 205 to an opposite end of conduit 220. Fluid communication between conduit 220 and bag 230 containing the material to be dispensed may be through opening 225 in conduit 220. In other example embodiments, conduit 220 is not included. Optionally, some flow components in each of the pressurized filling device and the refillable dispenser may be integrated into a single part. The integration may reduce bill of materials and assembly costs.

Figure 7A:
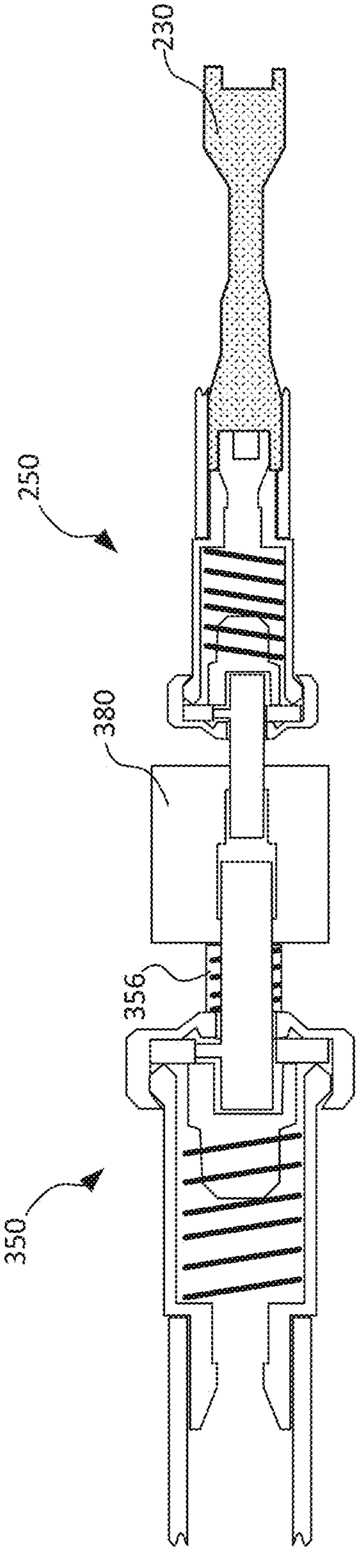
FIGS. 7A and 7B is simplified schematic drawing of an example fill valve and an example reservoir valve interfacing in a normally closed state (FIG. 7A) and open state (FIG. 7B) in accordance with some example embodiments.
Figure 7B:
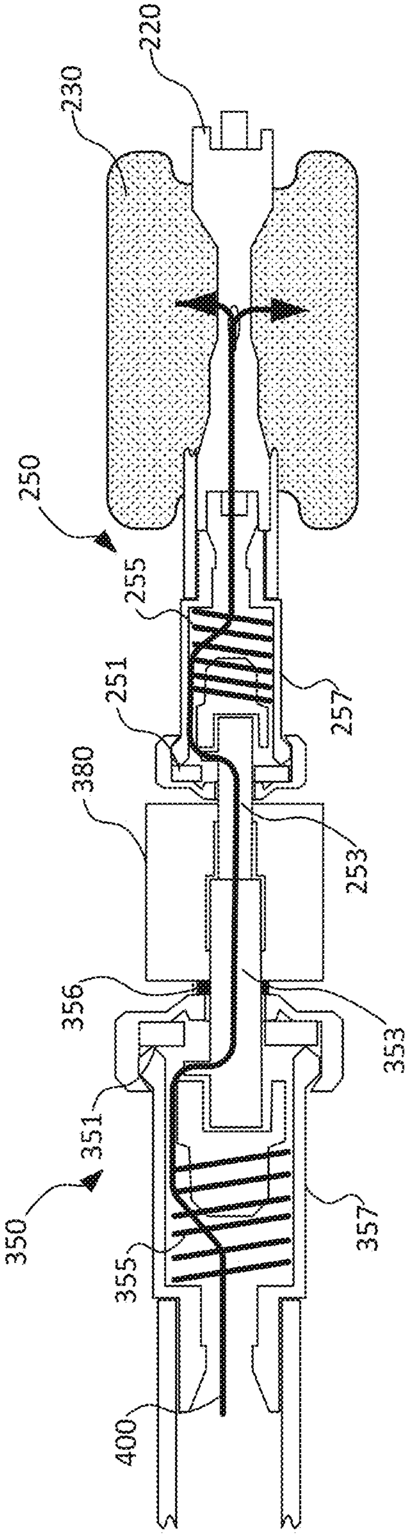

Reference is now made to FIGS. 7A and 7B showing a simplified schematic drawing of an example fill valve and an example reservoir valve interfacing in a normally closed state and open state respectively in accordance with some example embodiments. According to some example embodiments, each of filling valve 350 and valve 250 are aerosol valves. Stem 353 of filling valve 350 is movable within a housing 357, against a spring force with spring 355. When pressing stem 353, a seal with a stem gasket 351 is opened and flow through the valve may be initiated. Similarly, stem 253 of valve 250 is movable within a housing 257, against a spring force with spring 255. When pressing stem 253 a seal with a stem gasket 251 is broken and flow through valve 250 may be initiated. According to some example embodiments, adaptor 380 is configured to fluidly connect stem 253 with stem 353. When locking or pushing refillable dispenser onto docking base 360, stem 253 applies a pressing force in adaptor 380 on stem 353 that provides for releasing the normally closed seal of filling valve 350. Optionally, adaptor 380 is pushed toward stem 353 against an additional spring force from spring element 356. At the same time, pressure from spring 355 applies a force on stem 253 that provides for releasing the normally closed seal of filling valve 250. Each of stem 253 and 353 may be displaced by 0.5-1.0 mm when opened and together the displacement may be 1-2 mm. Based on the simultaneous opening of valve 250 and valve 350, flow 400 for filling refillable dispenser, e.g. filling bag 230 may be established. Since the pressurized filling device 300 is configured to be held at a higher pressure than refillable dispenser, flow 400 may be directed toward refillable dispenser. In other example embodiments, conduit 220 is not included.

Figure 7C:
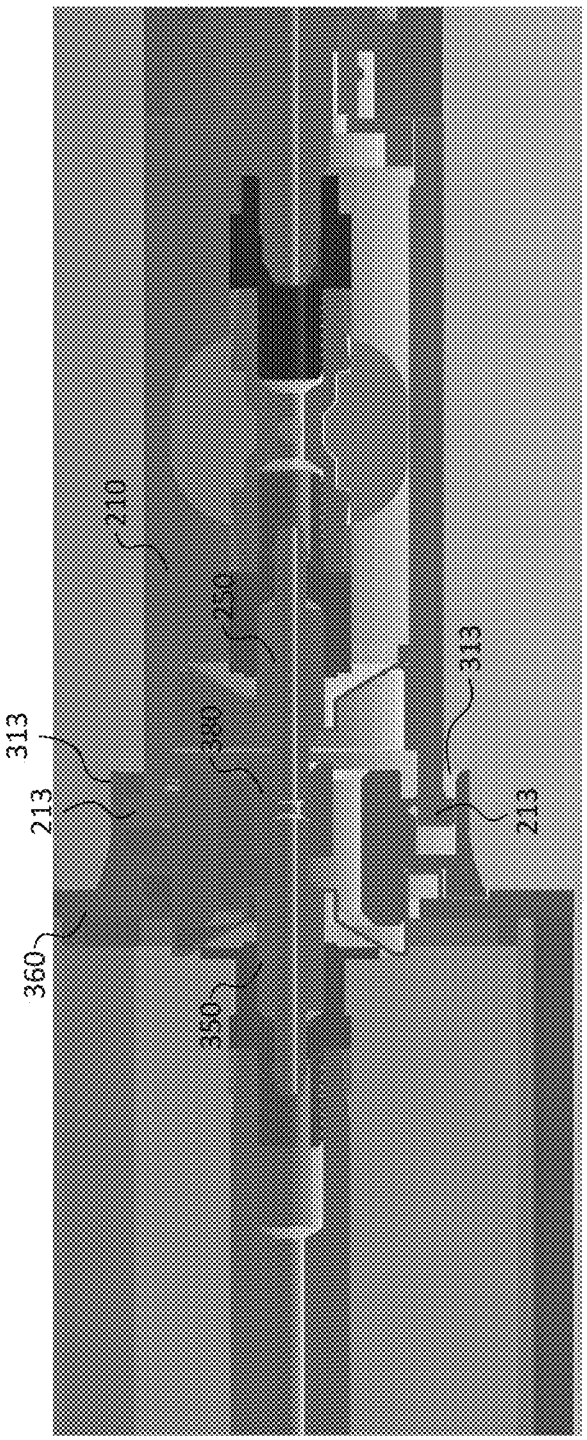
FIG. 7C is a simplified schematic drawing showing mounting of an example refillable dispenser on a pressurized refilling device in accordance with some example embodiments.

Reference is now made to FIG. 7C showing a simplified schematic drawing showing mounting of an example refillable dispenser on a pressurized refilling device in accordance with some example embodiments. According to some example embodiments, housing 210 of a refillable dispenser includes connecting feature 213 that is configured to be removable attached to a matching connecting feature 313 on docking base 360. Optionally, connecting features 213 and 313 are screw threads and the refillable dispenser may be screwed onto docking base 360 for refilling and then unscrewed once refilled.

Figure 8A:
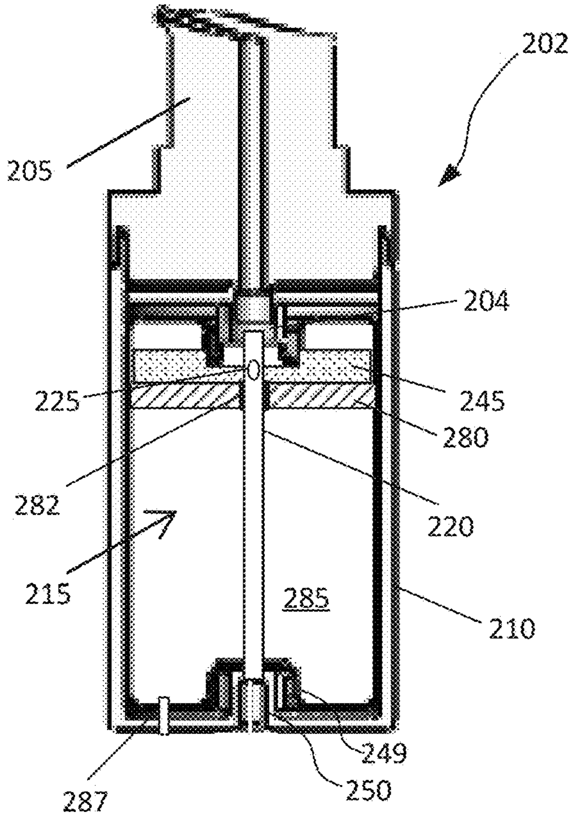
FIGS. 8A, 8B and 8C are simplified schematic drawings of another example refillable dispenser shown in three different modes of operation, all in accordance to some example embodiments of the invention.
Figure 8B:
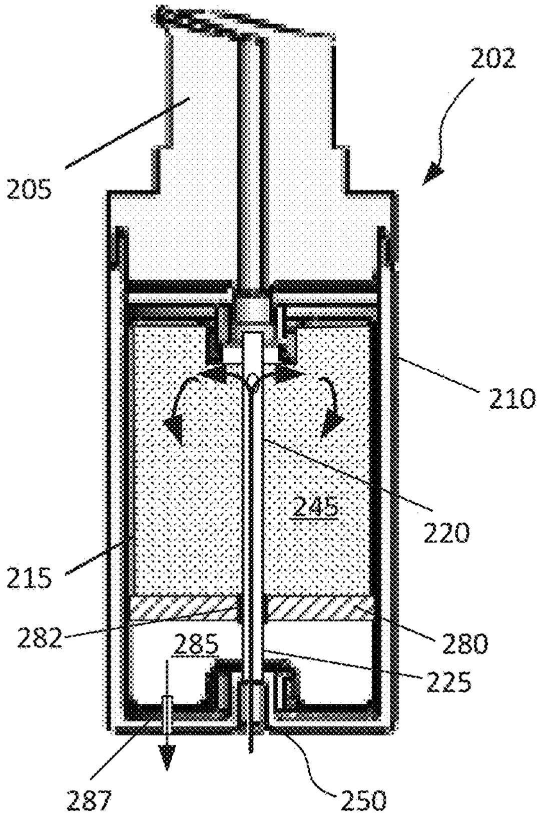
Figure 8C:
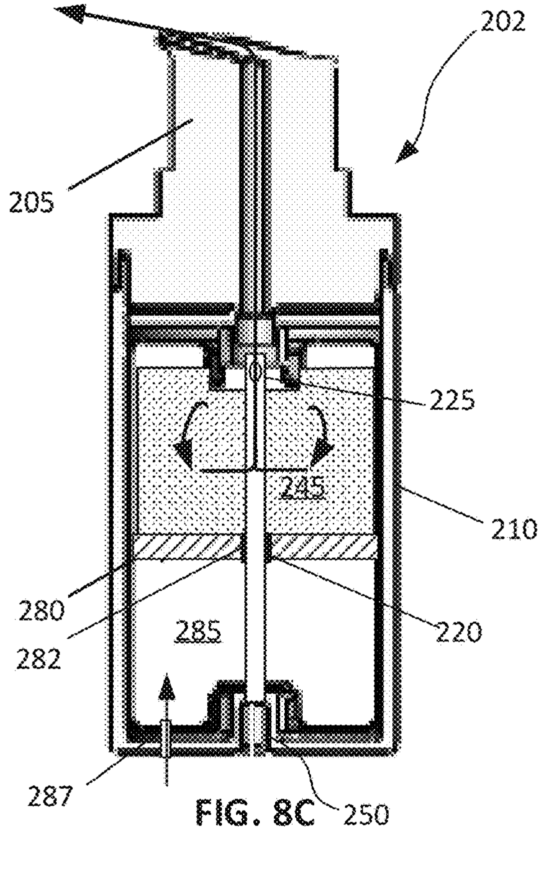

Reference is now made to FIGS. 8A, 8B and 8C showing a simplified schematic drawings of airless piston example refillable dispenser shown in three different modes of operation, all in accordance to some example embodiments of the invention. According to some example embodiments, a refillable dispenser 202 includes a piston 280 that is air tight to the walls of barrel or reservoir 215 that is configured to fill material 245 within reservoir without air 285 mixing with material 245. According to some example embodiments, piston 280 together with airless pump 205 provide dosage dispensing. Optionally, an urging member, e.g. a spring may be added below piston 280 to urge piston 280 during dispensing and the urging force may provide continuous dispensing.

According to some example embodiments, piston 280 is configured to slide passively based on the height of volume of material 245 within reservoir 215. Piston 280 preferably includes a through-hole 282 through which conduit 220 is deployed. The interface between piston 280 and the conduit 220 at the through-hole 282 in piston 280 is preferably sealed to prevent or reduce the likelihood of material leakage through through-hole 282. In some example embodiments, piston 280 is positioned distal to inlet 250 and proximal to outlet 204 while refillable dispenser is empty from material 245. In some example embodiments conduit 220 with opening 225 positioned at a height between outlet 204 and piston 280 provides the ability to both direct flow into reservoir 215 during refilling and out of reservoir 215 during dispensing. FIG. 8B schematically shows filling of refillable dispenser 202 through valve 250. Pressure of the filling action lowers piston 280. FIG. 8C schematically shows dispensing through airless pump 205. Piston 280 slides up based on a vacuum created when pumping or otherwise removing material 245 from reservoir 215. As piston 280 rises, the empty space beneath the piston gradually fills with air 285 entering via a filling point 287 at a base of dispenser 202. Piston 280 provides a barrier between material 245 contained in reservoir 215 and air 285 entering the refillable dispenser 202, thus preventing contamination and oxidation of material 245.

According to some example embodiments, refillable dispenser 202 may be filled based on engaging the refillable dispenser on the pressurized filling device as described for example in FIGS. 5A-7C.

In embodiments in which both the dispenser and the refilling device include a flexible bag containing the material and an elastic sleeve that imparts pressure to the bag, the characteristic stress-strain curve of the elastomeric material forming the sleeve of the refilling device is higher than the characteristic stress-strain curve of the elastomeric material forming the sleeve of the refillable dispenser, for any strain exhibited by the sleeves during the refilling operation. Specifically, defining the stress-strain curve as the elastic modulus of the elastomeric material as an increasing function of the elongation of the elastomeric material, the value of the elastic modulus for any elongation during the refilling operation is higher for the elastic sleeve of the refilling device than for the elastic sleeve of the refillable dispenser.

Preferably, the elastic modulus of the elastomeric material forming the sleeve of the refilling device at elongation X is the same or as the elastic modulus of the elastomeric material forming the sleeve of the refillable dispenser at elongation that is $\alpha$*X where a is a positive parameter larger than 1, optionally and preferably from about 1.25 to about 2.75.

Typical values for the elastic modulus of the elastomeric material forming the sleeve of the refilling device include, without limitation, at least one of the following ranges: from about 1.5 MPa to about 3 MPa at elongation of about 100%, from about 3 MPa to about 5 MPa at elongation of about 200%, from about 5.5 MPa to about 9 MPa at elongation of about 300%, from about 10 MPa to about 15 MPa at elongation of about 400%, and from about 15 MPa to about 30 MPa at elongation of from about 400% to about 600%.

Typical values for the elastic modulus of the elastomeric material forming the sleeve of the refillable dispenser include, without limitation, at least one of the following ranges: less than 1.5 MPa at elongation of about 100%, from about 1.5 MPa to about 3 MPa at elongation of about 200%, from about 3 MPa to about 5 MPa at elongation of about 300%, from about 5.5 MPa to about 9 MPa at elongation of about 400%, from about 10 MPa to about 15 MPa at elongation of about 500%, and from about 15 MPa to about 30 MPa at elongation of from about 500% to about 700%.

Figure 9:
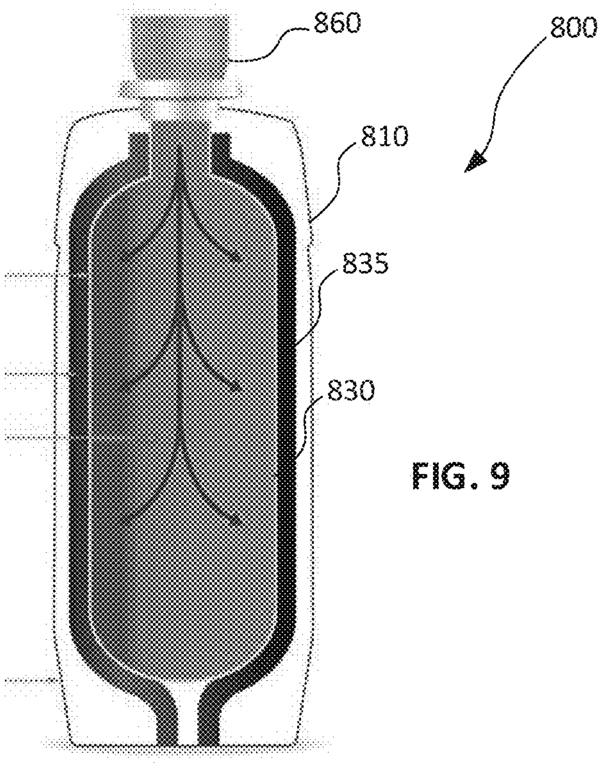
FIG. 9 is a schematic drawing of an example filling station for filling a pressurized refilling device in accordance with some example embodiments.

Reference is now made to FIG. 9 showing a schematic drawing of an example filling station for filling a pressurized refilling device in accordance with some example embodiments. According to some example embodiments, a filling station 800 may be electrically or manually or hydraulic powered filling station. Alternatively, a filling station 800 for filling a pressurized refilling device 300 may be a propellant-free dispenser. Optionally, filling station 800 is pressurized with an elastic sleeve 835 encompassing a flexible bag 830 that contains the material to be dispensed. The elastic sleeve 835 and flexible bag 830 may be housed in a reservoir 810. According to some example embodiments, filling station 800 is pressurized to a level that is greater than the pressure in pressurized refilling device 300. Optionally, filling is through a valve integrated with a docking base 860. The valve 860 may optionally be a press valve, e.g. an aerosol valve and filling may be based on mounting pressurized filling device 300 on docking base 860 in a manner similar to the manner in which pressurized filling device fills refillable dispenser 200.

Figure 10:
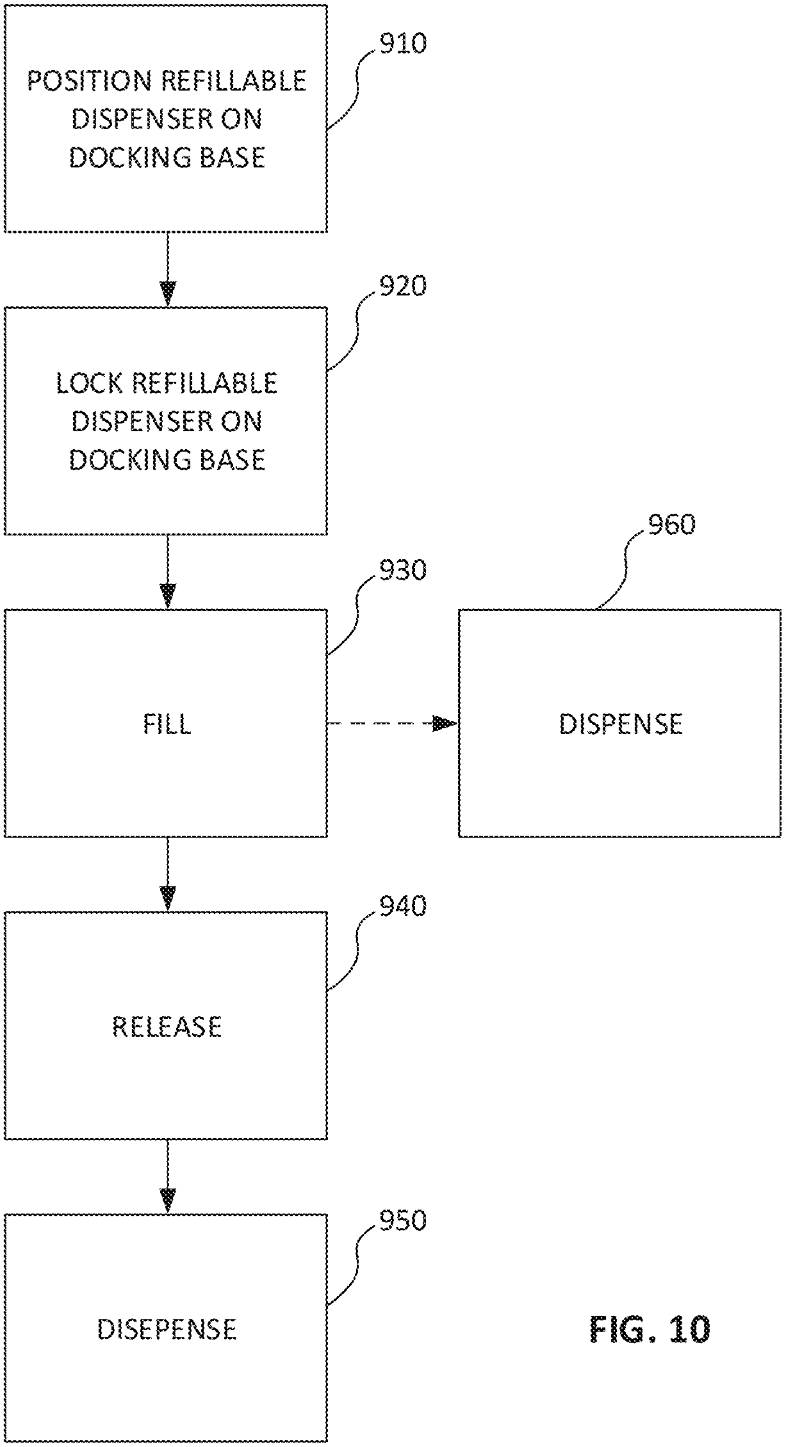
FIG. 10 is a simplified flow chart of an example method to fill a refillable dispenser in accordance with some example embodiments.

Reference is now made to FIG. 10 showing a simplified flow chart of an example method to fill a refillable dispenser in accordance with some example embodiments. According to some example embodiments, a kit for refilling a refillable dispenser includes a refillable dispenser that may be repeatedly refilled with a pressurized filling device. Filling may be based on position the refillable dispenser on a docking base of the pressurized filling device (block 910) and locking or otherwise operably engaging the refillable dispenser to the docking base (block 920). This operable engagement simultaneously opens respective flow valves in both the refillable dispenser and the pressurized filling device. Due to the difference in pressure, flow is initiated in the direction of the refillable dispenser and the refillable dispenser is filled (block 930). Releasing the operable engagement (block 940) is accompanied by simultaneous closing of respective flow valves in both the refillable dispenser and the material filled in refillable dispenser is maintained. Dispensing may be initiated through a dispensing pump or valve after filling (block 950). Optionally, dispensing may also be initiated during docking (block 960) and/or while refillable dispenser is operably engaged with pressurized filling device.

It is appreciated that certain features of the invention, which are, for clarity, described in the context of separate embodiments, may also be provided in combination in a single embodiment. Conversely, various features of the invention, which are, for brevity, described in the context of a single embodiment, may also be provided separately or in any suitable sub-combination or as suitable in any other described embodiment of the invention. Certain features described in the context of various embodiments are not to be considered essential features of those embodiments, unless the embodiment is inoperative without those elements.

In addition, any priority document(s) of this application is/are hereby incorporated herein by reference in its/their entirety.

What is claimed is:

1. A kit comprising:

a refillable dispenser that is propellant-free and that comprises an inlet, said refillable dispenser comprising an elastic sleeve applying pressure therein so as to ensure continuous dispensing by said refillable dispenser, and a filling device that is pressurized and propellant-free, said filling device comprising an outlet, wherein an outlet of the filling device is configured to disengageably connect to said inlet of the refillable dispenser, wherein connection between the inlet of the refillable dispenser and the outlet of the filling device establishes fluid communication between the filling device and the refillable dispenser and wherein a pressure difference between a pressure in said pressurized filling device and said pressure applied by said elastic sleeve of said refillable dispenser generates a unidirectional flow of material from the filling device to the refillable dispenser.

2. The kit according to claim 1, wherein the refillable dispenser comprises a valve fitted at the inlet, the valve being configured to be in a normally closed state and to open based on actuating a pressing force on the valve.

3. The kit according to claim 1, wherein the filling device comprises a filling valve at the outlet, the filling valve being configured to control release of the material from filling device.

4. The kit according to claim 1, wherein the filling device comprises an adaptor configured to provide the fluid communication based on the connection.

5. The kit according to claim 1, wherein the refillable dispenser includes a second outlet fitted with an airless pump through which the material is dispensed.

6. The kit according to claim 5, wherein the refillable dispenser comprises a conduit extending from the inlet to the second outlet, wherein the conduit includes at least one opening along its length, and wherein the at least one opening is in fluid communication with an inner volume of the refillable dispenser allowing the material flowing from the filling device to enter the inner volume of the refillable dispenser via said opening.

7. The kit according to claim 1, wherein the filling device comprises a reservoir for holding the material, and an inlet fitted with a second valve through which the material is to be received for refilling the reservoir of the filling device, wherein the second valve is configured to be in a normally closed state and to open based on actuating a pressing force on the second valve.

8. A refillable dispenser comprising:

a reservoir configured to contain a material to be dispensed and having an elastic sleeve applying pressure therein so as to ensure continuous dispensing of said material by the refillable dispenser;

an outlet through which the material within the reservoir is to be dispensed;

an inlet through which the material is to be received for refilling the reservoir with the material; and a valve fitted in the inlet and being configured to disenagagebly connect to an adaptor of a matching pressurized filling device, wherein the valve is configured to be in a normally closed state and to open based on actuating a pressing force on the valve and wherein flow of the material into the reservoir is based on pressurized flow through the valve from said pressurized filling device due to a pressure difference between a pressure in said pressurized filling device and said pressure applied by said elastic sleeve of the refillable dispenser, and wherein the refillable dispenser is propellant-free.

9. The refillable dispenser of claim 8 comprising a pump, wherein the pump is fitted in the outlet and is configured for dispensing material from the refillable dispenser.

10. The refillable dispenser of claim 8, comprising a press valve fitted in the outlet and wherein the press valve is configured for continuous flow.

11. The refillable dispenser of claim 8, wherein the reservoir includes a base and a top end opposite the base and wherein the inlet is formed in the base.

12. The refillable dispenser of claim 8, wherein the refillable dispenser is a propellant-free dispenser.

13. The refillable dispenser of claim 8, wherein the reservoir includes a flexible bag with an open end, wherein the open end is fitted around the valve with a sealed fitting and wherein the valve is configured to control flow of the material into the bag.

14. The refillable dispenser of claim 8, comprising a piston within the reservoir, wherein the piston is configured to move along a longitudinal direction along the reservoir based on the material being dispensed or filled.

15. The refillable dispenser of claim 8, comprising a conduit extending from the inlet to the outlet, wherein the conduit includes at least one opening along its length, wherein the at least one opening is in fluid communication with the reservoir.

16. A pressurized refilling device comprising:

a reservoir configured to contain a material;

a filling valve configured to control release of the material contained in the reservoir;

a docking base configured to receive a refillable dispenser to be filled, wherein the refillable dispenser to be filled includes a first valve through which the material is received within the refillable dispenser; and an adaptor configured to provide fluid communication between the filling valve and the first valve based on the refillable dispenser being mounted on the docking base.

17. The device of claim 16, wherein the filling valve is configured to be in a normally closed state and to open based on actuating a pressing force on the filling valve with the adaptor.

18. The device of claim 16, wherein the adaptor is configured to apply a pressing force on at least one of the filling valve and the first valve based on the refillable dispenser being mounted on the docking base.

19. The device according to claim 16, wherein the filling valve is a press valve and wherein the press valve is configured for continuous dispensing.

20. The device according to claim 16, wherein the device is a propellant-free dispenser.

21. The device according to claim 16, wherein the reservoir includes a flexible bag for containing the material, wherein an open end of the flexible bag is fitted around the filled valve with a sealed fitting and wherein the filling valve is configured to control flow of the material out of the flexible bag.

22. The device according to claim 16, comprising an inlet through which the material is to be received for refilling the reservoir.

23. The device according to claim 16, wherein the adaptor is movable with respect to the docking base and is configured to advance toward the filling valve based on mounting the refillable dispenser on the docking base.

24. The device according to claim 16, wherein the reservoir is configured to contain the material under pressure.

25. The device according to claim 16, wherein the material is a liquid, a foam, gel, serum, or paste.

26. A method of filling a refillable dispenser, the method comprising connecting an inlet of refillable dispenser that is propellant-free to an outlet of a filling device that is propellant-free and pressurized, so as to establish fluid communication between the filling device and the refillable dispenser and to generate a unidirectional flow of material from the filling device to the refillable dispenser;

wherein the refillable dispenser comprises an elastic sleeve applying pressure therein so as to ensure continuous dispensing by the refillable dispenser, wherein said outlet of the filling device is configured to disengageably connect to said inlet of the refillable dispenser, and wherein said unidirectional flow of material is generated by a pressure difference between a pressure in said pressurized filling device and said pressure applied by said elastic sleeve of the refillable dispenser.

27. The method according to claim 26, wherein each of the inlet and the outlet is fitted with a normally closed valve and wherein connecting the inlet to the outlet includes simultaneously opening each of the normally closed valves.

28. The method according to claim 27, wherein the normally closed valves are aerosol valves and wherein simultaneously opening each of the normally closed valves includes pressing stems of the normally closed valves against each other.

29. A method of dispensing a material, comprising executing the method according to claim 26, and dispensing the material out of the refillable dispenser while the refillable dispenser is connected to the filling device.

* * * * *